Jan. 31, 1967  H. L. MOLDEN ETAL  3,301,419
WHEEL LIFT
Filed July 14, 1965  2 Sheets-Sheet 1
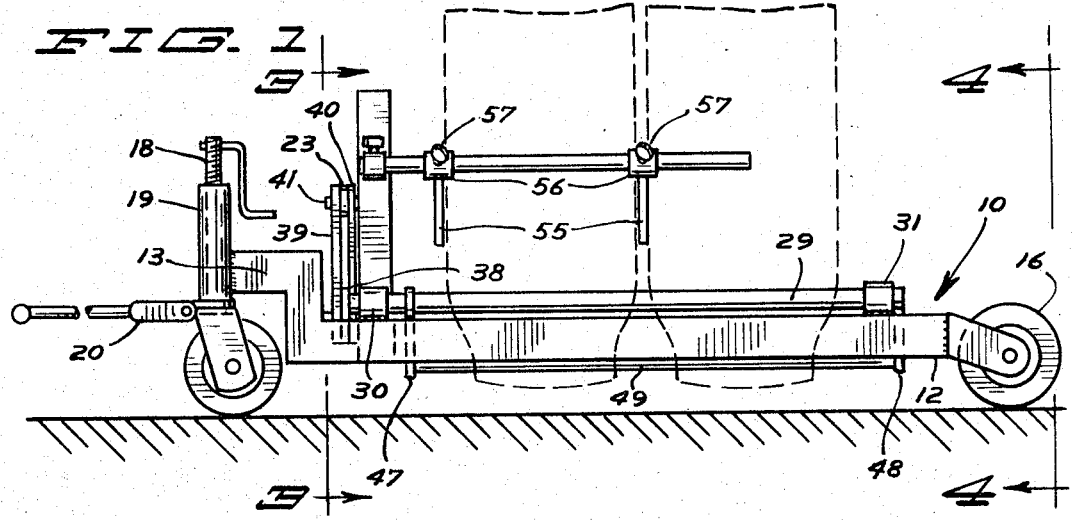
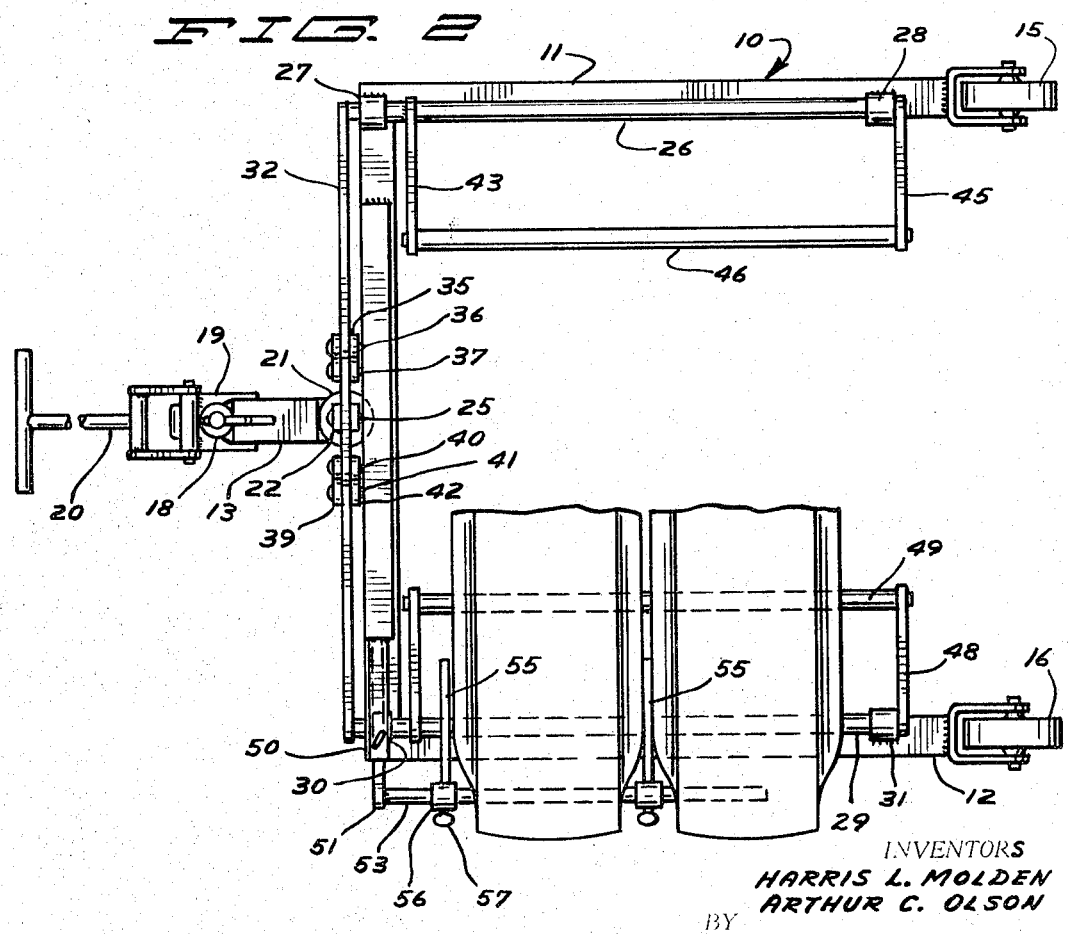
INVENTORS
HARRIS L. MOLDEN
ARTHUR C. OLSON
BY
Braddock & Burd
ATTORNEYS

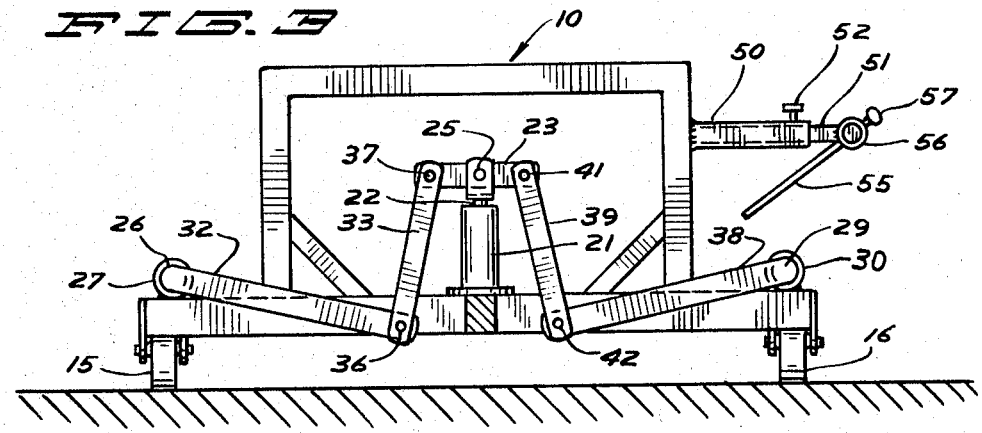
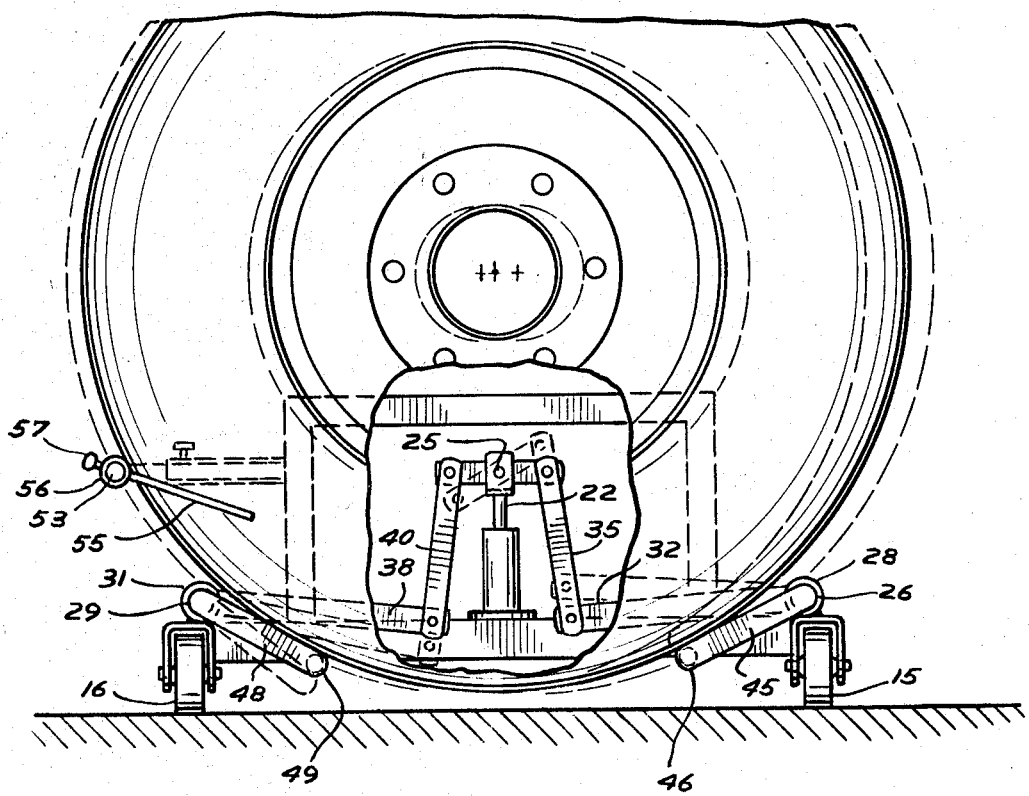

United States Patent Office 3,301,419
Patented Jan. 31, 1967

3,301,419
WHEEL LIFT
Harris L. Molden and Arthur C. Olson, both of
Watson, Minn. 56295
Filed July 14, 1965, Ser. No. 471,941
7 Claims. (Cl. 214—332)

This invention relates to an improvement in vehicle maintenance equipment and more particularly to a wheel lifting means for positioning wheels to be attached to a vehicle.

When a wheel is to be secured on the hub of a vehicle it is necessary to first accurately align holes in the wheel with lug bolt holes in the vehicle hub. Such alignments for small vehicle wheels, such as those on the family automobile do not present much of a problem since the wheels are small in size and may easily be handled by one person. In larger vehicles, however, such as trucks and trailers, the wheels are of such size and weight that it is very difficult for a man to properly position the wheels unassisted. If one truck wheel is difficult to position, two truck wheels are more difficult to position. Thus, it is extremely desirable to provide a means for lifting and positioning wheels to be placed on the vehicle hub.

Many wheel dollies or jacks are known to the prior art for positioning heavy truck wheels. In each of the prior art devices, however, the wheel lifting members comprise a pair of parallel arms, supported at one end, which extend outwardly from a frame. The further away from the frame that a heavy wheel is placed on the support arms, the more severe will be the stresses imposed on the frame connection. Unless a frame of very substantial strength is provided the wheel supporting arms may become loose or bend at the connection point to the frame. If the arms are not of heavy construction then they will bend in response to the wheel load. The use of heavily reinforced frames and arms increases the cost of a wheel lift considerably. Thus it is desirable to provide a wheel lift which permits one or more heavy wheels to be positioned without the necessity of a heavy frame and by using relatively light wheel arms which rigidly support wheels without bending.

Another shortcoming which prior art devices have is the manner in which tires are held on the wheel supporting arms while they are being attached to the vehicle. The prior art devices use a chain which is fastened at each of its ends to the frame to secure the wheels once they have been positioned relative to the lift. The problem with this is that in the use of a chain to fix the wheels to the lift, once the wheels have been fixed to the lift they are not readily adjustable so that they can be lined up with the lug bolt holes in the hub of the vehicle. It is desirable to have a device which would allow wheels supported by it to be rotated to provide easy alignment of the wheel mounting holes with the lug bolt holes in the vehicle hub.

Still another problem inherent in the prior art devices is that there is no provision for adjustment when the holes in the wheel are slightly out of line, transversely, with the lug bolt holes in the vehicle hub. Previously, it was necessary to move the whole unit transversely or to go through an involved adjustment of the lift to correct the adjustment. It is apparent that it is much more convenient to have a lift in which wheels could be moved slightly transversely to line up with lug bolt holes in the vehicle hub while continuously maintaining support of the wheels.

The present invention provides a lift on which wheels are held by elongated members which are supported on both ends thus eliminating bending inherent in a cantilever support. Also, the present invention provides a means for supporting the wheels in an upright position while they are on the lift so that the wheels can be rotated for adjusting purposes. This invention also provides a means for continuously supporting wheels while they are laterally adjusted relative the lift.

Referring now to the drawings,

FIGURE 1 is a side elevation of the device in which dotted lines are used to depict wheels as would be carried by the lift and to show hidden parts;

FIGURE 2 is a plan view of the device drawn to the same scale as FIGURE 1 and in which dotted lines are used to show hidden parts;

FIGURE 3 is a view taken along the line 3—3 of FIGURE 1, and is drawn to the same scale as FIGURE 1; and FIGURE 4 is an end view taken in a direction of line 4—4 of FIGURE 1, with wheels shown in position and in which dotted lines are used to show alternate positions of wheels carried on the lift and part of the wheels are cut away to show more clearly the action of the linkage.

As best seen in FIGURE 2 the wheel lift is provided with a Y-shaped frame 10. Frame 10 is shown with legs 11 and 12 and a base leg 13, all of which are parallel. To make the wheel lift readily movable about a flat surface, wheels are provided. The wheel 15 is secured to leg 11, and a similar wheel 16 is secured to the end of leg 12. Since the wheel lift will be pushed about a floor and must be steered in various directions, a caster 17 is secured to base leg 13. Caster 17 is desirably provided with a vertical adjustment so that the base leg may be raised or lowered to accommodate a vehicle (not shown) which has been jacked up so that its axle is at angle to the horizontal. One convenient means for providing such a vertical adjustment is to provide a threaded shaft 18 to which caster 17 is mounted. Threaded shaft 18 is screwed into a threaded socket 19, which is secured to base leg 13. An adjustment to tilt the wheel lift is made by rotating threaded shaft 18 in or out of threaded socket 19. A handle 20 is secured to caster 17 to facilitate movement and steering of the wheel lift.

A means for lifting, which includes a movable element having two directions of movement, is secured to frame 10 between legs 11 and 12. A suitable means is shown as the hydraulic jack 21 secured to base leg 13. The movable portion of the jack 21 is the lifting member 22.

A pivoting arm 23 is secured at its center to lifting member 22 for limited pivoting motion. One means for pivotally securing arm 23 is by use of the pin 25 through lifting member 22 and arm 23.

An elongated member is rotatably secured to leg 11. A suitable elongated member is shown as the shaft 26 which is journaled to leg 11 by the bearings 27 and 28. A similar elongated member, shown as the shaft 29, is similarly rotatably secured to leg 12 by the bearings 30 and 31.

At the left end of shaft 26, as seen in FIGURE 2, a lever 32 is rigidly secured. Lever 32 is inwardly extended towards jack 21. Linkage means are provided for pivotally connecting lever 32 to arm 23. Suitable linkage means are shown as links 33 and 35 which are pinned to lever 32, as by the pin 36, and to arm 23, as by the pin 37. A similar lever 38 is rigidly secured to shaft 29 and extends inwardly towards jack 21. Linkage means are also provided for pivotally connecting lever 38 to arm 23. Suitable linkage means are shown as links 39 and 40. Links 39 and 40 are pinned to arm 23, as by the pin 41, and to lever 38, by the pin 42.

As seen in FIGURE 3, when lifting member 22 of jack 21 is raised, shaft 26 will be rotated counterclockwise while shaft 29 is rotated clockwise. Lowering lifting element 22 causes shaft 26 to be rotated in a clockwise direction and shaft 29 in a counterclockwise direction.

A first pair of lifting arms is secured to shaft 26 in spaced relation near the ends of shaft 26. The first pair of lifting arms, designated 43 and 45, are best seen in FIGURE 2. Lifting arms 43 and 45 are relatively short in relation to shaft 26. It is also important that lifting arms 43 and 45 be of sturdy construction so as to be able to carry a relatively heavy load without distortion.

A first elongated wheel engaging member is secured between arms 43 and 45. A suitable wheel engaging member is shown as the wheel support roller 46 which is rotatably mounted between lifting arms 43 and 45.

A second pair of inwardly extending lifting arms 47 and 48 are secured near the ends of shaft 29. Lifting arms 47 and 48 are also of substantial construction so as to be able to carry a relatively heavy load without distortion.

A second elongated wheel engaging member, shown as the wheel support roller 49 is rotatably secured between arms 47 and 48. While non-rotating elongated members may be substituted for wheel support rollers 46 and 49, it is convenient to provide these members as rollers to allow wheels carried on the wheel lift to be rotated to facilitate alignment of the holes in the wheels with the lug bolt holes of the vehicle hub.

It will be noted that wheel support roller 46 is supported on both ends by lifting arms 43 and 45. Also, wheel support roller 49 is supported on both ends by lifting arms 47 and 48. This provides a rigid unit with lifting members that are not easily bent by the weight of heavy wheels. There are no free outboard ends of the support members in the present wheel lift, but rather members which are sturdily supported on each end are provided. Thus wheels carried on rollers 46 and 49 are held positively with no likelihood of bending the wheel support members.

It will be appreciated that when lifting member 22 of jack 21 is raised, as will be seen in FIGURE 3, rollers 46 and 49 will rotate about the respective axes of shafts 26 and 29. Thus, wheels carried by rollers 46 and 49 will be lifted. The opposite result is attained by lowering lifting member 22.

A tube 50 is secured to frame 10 transverse to the wheel lift. A sliding member, such as the bar 51 is slidably secured into tube 50. Bar 51, thus, forms a laterally adjustable support arm. A thumb screw 52 is threaded to tube 50 and may be screwed into engage bar 51 to hold that member's position once adjusted. A third shaft 53 parallel to shafts 26 and 29, is rigidly secured to bar 51. As will be seen in FIGURE 2, at least one rigid finger 55 is slidably and pivotally secured on third shaft 53. One means for securing finger 55 to third shaft 53 is to provide a hub 56 secured to finger 55. Hub 56, then, is slidably and pivotally secured to third shaft 53. A thumb screw 57 is threadably secured to hub 56 so that it may be screwed in to bear upon third shaft 53 and thus hold finger 55 against sliding or pivoting.

When a wheel is placed on rollers 46 and 49 a finger 55 may be slid along third shaft 53 to a position to engage and hold the wheel upright. The wheel is then secured in place by tightening thumb screw 57 to bear on third shaft 53.

To position wheels to be attached to a vehicle, the wheels are first placed on rollers 46 and 49 of the wheel lift, fingers 55 are then positioned to engage and hold the wheels and are locked. The weight of the wheels is borne by frame 10 via rollers 46 and 49 and the relatively short lifting arms 43, 45, 47 and 48. When two wheels are to be attached to a vehicle the wheels are rotated relative to one another to align the respective lug bolt holes with each other. Legs 11 and 12 are then positioned on either side of the axle of the vehicle (not shown) as would be viewed from above. Jack 21 is operated to raise lifting member 22. As was previously described, raising lifting member 22 causes rollers 46 and 49 to be lifted, raising wheels carried on these members.

In use the wheel lift is put in approximate position for placing two wheels on the hub of the vehicle. If the lug bolt holes of the two wheels, which are in alignment with one another, are not quite in alignment with the lug bolt holes of the vehicle, the wheels may be rotated until proper alignment is attained.

It may be that the wheel lift will be slightly to one side or the other of the vehicle axle, as viewed from above, as it is pushed into place and that wheels to be placed on the vehicle will have to be moved to account for this. In FIGURE 4, it will be noted that by pushing on the right side of the wheel, the roller 49 will be depressed, while roller 46 is raised to maintain contact with the wheel. Such movement is permitted by the pivoting arm 23 which pivots a limited amount about pin 25, as depicted in FIGURE 4. A side push on the wheels which are supported on rollers 46 and 49 will cause shafts 26 and 29 to rotate in the same direction and provide continuous support for wheels on rollers 46 and 49 throughout this transverse adjustment.

It will be appreciated that this disclosure provides a rigid wheel lift which does not have long wheel supporting members which are free at one end and which may be bent by heavy loads placed at the outward end. In the present invention, the loads are placed on supporting members which are adequately supported at each end and which are mechanically lifted to place the load in the appropriate position. Wheels supported on the present wheel lift are adjustable relative to the wheel lift while so supported.

The embodiments of this invention in which an exclusive property or privilege is claimed are defined as follows:

1. A wheel lift for positioning and holding wheels to be placed on a vehicle comprising:
   a movable frame;
   first and second spaced apart elongated parallel members rotatably secured to said frame;
   a first pair of relatively short arms each of which is rigidly secured near an end of said first elongated member, said first pair of arms extending inwardly from said first elongated member generally in direction toward said second elongated member;
   a first elongated wheel engaging member secured between said first pair of arms for engaging and partially supporting at least one wheel transversely at the periphery of the wheel, said first wheel engaging member being adapted to rotate with said first elongated member about the axis of said first elongated member;
   a second pair of relatively short arms each of which is rigidly secured near an end of said second elongated member, said second pair of arms extending inwardly from said second elongated member generally in direction toward said first elongated member;
   a second elongated wheel engaging member secured between said second pair of arms for cooperating with said first elongated wheel engaging member to support at least one wheel transversely at the periphery of the wheel, said second wheel engaging member being adapted to rotate with said second elongated member about the axis of said second elongated member;
   movable means mounted on said frame capable of being selectively moved in first and second directions with respect to said frame; and
   linkage means secured to said movable means and to said first and second elongated members to cause said first and second elongated members to rotate in opposite directions when said movable means is moved in either of said directions said linkage means including an arm having a central portion pivoted to said movable means, levers connected to the first and second elongated members, and links pivotally connected to opposite outer end portions of the said arm and said levers whereby said elongated members can be rotated a relative small amount in the same direction causing a wheel supported on said first and second elongated wheel engaging members to be selectively transversely adjusted while maintaining the support of the wheel by said first and second elongated wheel engaging members.

2. The wheel lift of claim 1 wherein at least one rigid finger is selectively movably secured to said frame at one end of said finger, in position to engage a wheel supported on said first and second elongated wheel engaging members to hold the wheel in upright position.

3. In a wheel lift having a movable frame with a pair of parallel legs for inserting under a vehicle on which wheels are to be attached, and a jack secured to the frame between the legs, the jack being employed for lifting loads, the improvement comprising: first and second parallel elongated members each rotatably secured to a leg of the frame, a first pair of relatively short inwardly disposed spaced apart lifting arms rigidly secured to said first elongated member to rotate with said first elongated member, a second pair of relatively short inwardly disposed spaced apart lifting arms rigidly secured to said second elongated member to rotate with said second elongated member, first wheel engaging member secured to each of said first pair of arms, a second wheel engaging member secured to each of said second pair of arms, said second wheel engaging member located in parallel spaced relation with respect to said first wheel engaging member, and linkage means secured to the jack and to said first and second elongated members for rotating said first and second elongated members in opposite directions about the longitudinal axes of said first and second elongated members when the jack is operated, said linkage means including a pair of links each pivotally attached to one of said first and second elongated members and a link arm pivoted to said jack and to each of said links so that said first and second elongated members can be rotated a relatively small amount in the same direction about their respective longitudinal axes thus to permit transverse adjustment of wheels carried by the lift while maintaining support of said wheels by said first and second wheel engaging members.

4. The wheel lift of claim 3 wherein at least one rigid finger is selectively movably mounted on the frame at one end of said finger in position to engage and hold upright various sizes of wheels on the lift.

5. A wheel lift for positioning wheels to be secured to a vehicle comprising: an elongated Y-shaped frame, including two outer legs and a base leg located in parallel relation with respect to one another, a frame support wheel secured to the ends of each of the two outer legs, a frame support caster adjustably secured to the base, means for raising the caster with respect to the base leg, a handle secured to said caster for moving and steering said frame, a jack secured to said frame, said jack having a lifting member, a first shaft rotatably secured to a first of said two outer legs of said frame, said first shaft being parallel to said outer leg, second shaft rotatably secured to the outer leg of said two outer legs of said frame, said second shaft rotatably secured to the other leg of said two outer legs of said frame, said second shaft being parallel to a second of said outer legs, a first pair of spaced apart relatively short lifting arms secured to said first shaft extended inwardly from said first leg, a second pair of spaced apart relatively short lifting arms secured to said second shaft extended inwardly from said second leg, first elongated wheel engaging member secured to first pair of arms, a second elongated wheel engaging member secured to said second pair of arms, first lever rigidly secured to said first shaft for rotating said first shaft, second lever rigidly secured to said second shaft for rotating said second shaft, linkage means operably connecting said first and second levers to the lifting member of said jack so that said first and second shafts are simultaneously rotated in opposite directions when the jack is operated, said linkage means including an arm pivotally secured to the lifting member of said jack, said arm adapted to have limited pivotal movement about an axis parallel to said first and second shafts thus to permit limited rotation of said first and second shafts in the same direction to provide a transverse position adjustment of wheels carried on the wheel lift while maintaining continuous support of the wheels by said first and second wheel engaging members.

6. The wheel lift of claim 5 wherein a third shaft is adjustably secured to the frame to have an axis parallel to those of said first and second shafts to have movement transverse to the lift, and at least one rigid bar selectively slidably and pivotally mounted transversely of and on said third shaft in position for engaging wheels carried on the wheel lift.

7. The wheel lift of claim 5 wherein said first and second elongated wheel engaging members are constituted as rollers rotatably secured between said first and second pairs of lifting arms respectively to permit wheels carried on the wheel lift to be rotated about their axes to facilitate alignment of lug holes in said wheels with mating holes in the vehicle to which the wheels are attached.

References Cited by the Examiner

UNITED STATES PATENTS

| | | | |
|---|---|---|---|
| 1,555,152 | 9/1925 | Passow | 214—331 |
| 1,847,382 | 3/1932 | Collins | 214—332 |
| 2,170,607 | 8/1939 | Green | 214—332 |
| 2,231,192 | 2/1941 | Olsen | 214—332 |
| 2,476,493 | 7/1949 | Johnson | 214—332 |
| 2,725,998 | 12/1955 | Huff | 214—332 |

HUGO O. SCHULZ, *Primary Examiner.*